(12) United States Patent
Cassarly et al.

(10) Patent No.: US 7,163,326 B2
(45) Date of Patent: Jan. 16, 2007

(54) EFFICIENT LUMINAIRE WITH DIRECTIONAL SIDE-LIGHT EXTRACTION

(75) Inventors: William J. Cassarly, Mason, OH (US); Thomas L. R. Davenport, Tucson, AZ (US); John M. Davenport, Middleburg Heights, OH (US); Chris H. Jenson, Twinsburg, OH (US)

(73) Assignee: Fiberstars, Inc., Solon, OH (US)

( * ) Notice: Subject to any disclaimer, the term of this patent is extended or adjusted under 35 U.S.C. 154(b) by 33 days.

(21) Appl. No.: 11/108,279

(22) Filed: Apr. 18, 2005

(65) Prior Publication Data

US 2005/0231973 A1    Oct. 20, 2005

Related U.S. Application Data

(60) Provisional application No. 60/562,921, filed on Apr. 16, 2004.

(51) Int. Cl.
  *F21S 8/06* (2006.01)
(52) U.S. Cl. .................. 362/551; 362/576; 362/92
(58) Field of Classification Search ................ 362/556, 362/576, 511, 551, 92; 385/901, 15
  See application file for complete search history.

(56) References Cited

U.S. PATENT DOCUMENTS

| | | |
|---|---|---|
| 3,497,981 A | 3/1970 | Tyne |
| 3,535,018 A | 10/1970 | Vasilatos |
| 4,585,298 A | 4/1986 | Mori |
| 4,765,701 A | 8/1988 | Cheslak |
| 4,907,132 A | 3/1990 | Parker |
| 5,036,435 A | 7/1991 | Tokuda et al. |
| 5,222,795 A | 6/1993 | Hed |
| 5,307,245 A | 4/1994 | Myers et al. |
| 5,312,569 A | 5/1994 | Mezei |
| 5,312,570 A | 5/1994 | Halter |
| 5,499,912 A | 3/1996 | Mezei |

(Continued)

OTHER PUBLICATIONS

Photograph of light pipe shown at the following two exhibitions: (1) Defense Advanced Research Projects Agency (DARPA), attended by military—and military contractors, Mar. 9-11, 2004 (DARPA) (2) Light Fair, Las Vegas, Nevada, attended by the public, Mar. 31-Apr. 2, 2004.

(Continued)

*Primary Examiner*—Sharon Payne
(74) *Attorney, Agent, or Firm*—Charles E. Bruzga; Bruzga & Associates

(57) ABSTRACT

A luminaire with directional side-light extraction comprises a light pipe with a light-carrying core. The light pipe has light-extraction structure along a first longitudinal side of the luminaire, which is confined to a radial swath of the luminaire, along the longitudinal axis of the luminaire, of substantially less than 180°. For efficiency, the second end has light-saving structure for directing saved light from the second end towards the first end, at redirection angles other than an excluded range of redirection angles, so long as the photon content of light at so-called alpha redirection angles is at least 10 percent of the photon content of light at so-called beta redirection angles, where the excluded range of redirection angles is defined by:

$$|\beta_r| <= 20° \text{ and } |\alpha_r| < |\beta_r|/10,$$

where $\beta_r$ is the beta redirection angle and $\alpha_r$ is the alpha redirection angle.

30 Claims, 12 Drawing Sheets

U.S. PATENT DOCUMENTS

| | | | |
|---|---|---|---|
| 5,542,017 A * | 7/1996 | Koike | 385/123 |
| 5,857,761 A | 1/1999 | Abe et al. | |
| 5,982,969 A | 11/1999 | Sugiyama et al. | |
| 5,987,199 A | 11/1999 | Zarian et al. | |
| 6,039,553 A | 3/2000 | Lundin et al. | |
| 6,095,673 A | 8/2000 | Goto et al. | |
| 6,169,836 B1 | 1/2001 | Sugiyama et al. | |
| 6,215,947 B1 | 4/2001 | Abramowicz et al. | |
| 6,278,827 B1 | 8/2001 | Sugiyama et al. | |
| 6,488,397 B1 | 12/2002 | Masutani et al. | |
| 6,563,993 B1 | 5/2003 | Imamura et al. | |
| 6,577,794 B1 | 6/2003 | Currie et al. | |
| 6,597,834 B1 | 7/2003 | Hata | |
| 6,637,924 B1 | 10/2003 | Pelka et al. | |
| 6,726,341 B1 | 4/2004 | Pashley et al. | |
| 6,783,269 B1 | 8/2004 | Pashley et al. | |
| 2002/0159741 A1 | 10/2002 | Graves et al. | |

OTHER PUBLICATIONS 4 pages entitled "Unlglo Backlighting" from http://www.poly-optical.com/uniglo.html webpage—(viewed on May 2, 2004) showing uniform extraction of light from a light guide—admitted as prior art.

2 pages entitled "Design of Luxaura Light Guide" from http://www.luxaura.com/tech.shtml website—(viewed on May 2, 2004) showing emitting light in a radial swath—admitted as prior art.

Specification and drawings for U.S. Appl. No. 10/796,830, filed Mar. 9, 2004, for Light Pipe with Directional Side-Light Extraction by Roger F. Buelow II, John M. Davenport, and Chris Jenson. This application is copending with the present application and is assigned, or subject to assignment, to the same assignee as the present application.

Specification and drawings for U.S. Appl. No. 10/797,383, filed Mar. 10, 2004, for Light Pipe with Side Light Extraction by Roger F. Buelow II, Chris H. Jenson, and John M. Davenport. This application is copending with the present application and is assigned, or subject to assignment, to the same assignee as the present application.

Specification and drawings for U.S. Appl. No. 10/797,761, filed Mar. 10, 2004, for Light Pipe with Side Light Extraction by Roger F. Buelow II, Chris H. Jenson, and John M. Davenport. This application is copending with the present application and is assigned, or subject to assignment, to the same assignee as the present application.

US 6,419,383, 07/2002, Lundin (withdrawn)

* cited by examiner

EFFICIENT LUMINAIRE WITH DIRECTIONAL SIDE-LIGHT EXTRACTION

This application claims priority from U.S. Provisional Patent Application No. 60/562,921, filed on Apr. 16, 2004.

FIELD OF THE INVENTION

The present invention relates to luminaires comprising light pipes in which light is extracted from the side of the light pipe in a preferential direction. More particularly, the invention relates to extraction of light from the side of light pipes in an efficient, and preferably, uniform manner.

BACKGROUND OF THE INVENTION

Light pipes are primarily used for lighting in two main modes. In an end-light mode, the light pipe is optimized to carry light along its length, and transmit it to the output face of the light pipe, typically to a lighting fixture. In a side-light mode, light is extracted from the side of the light pipe and provides illumination along its length. The present invention relates to a side-light mode in which light is extracted in an efficient, and preferably uniform, manner from the side of a light pipe. The portion of a light pipe in which light is extracted from the side of the light pipe is referred to herein as a "luminaire." Luminaires can be integrated with end-light mode light pipe systems or luminaires can be directly coupled to a source.

One known luminaire is disclosed in U.S. Pat. No. 5,857,761 to Abe et al. The Abe et al. patent is directed to the specialized application of providing light to a thin, flat display panel such as used as a display for notebook computers. Abe et al. had a lesser need for efficiency and directionality of light extraction from a luminaire as compared to applications for lighting wide areas, as, for instance, a person's office. Abe et al., in fact, employs diffusion members in some embodiments to achieve uniformity at the expense of efficiency and directionality since their luminaire does not achieve on its own adequate uniformity.

U.S. Pat. No. 6,488,397 to Masutani et al. discloses a luminaire with a constant-width strip of light-extraction means. However, the Masutani et al. disclosure does not address the concerns of efficiency and uniformity of illumination addressed by the various embodiments of the present invention.

US Patent Publication No. 20020159741A1 discloses various applications of luminaires. However, such applications do not address the efficiency and uniformity of illumination addressed by the various embodiments of the present invention.

In connection with an embodiment of the invention including a reflecting enclosure spaced from a luminaire, U.S. Pat. No. 6,095,673 to Goto et al. discloses a luminaire with an enclosure. However, the enclosure of Goto et al. intimately contacts the luminaire so that there is no air gap between luminaire and enclosure.

It would be, thus, desirable to provide luminaires having embodiments providing efficiency of illumination, and preferably also uniformity of illumination.

SUMMARY OF THE INVENTION

The present invention provides, in a preferred form, a luminaire with directional side-light extraction. The luminaire comprises a light pipe with a light-carrying core. The light-pipe has a first end in which light from a first light source is received, a second end, and a longitudinal axis. The surface of the core of the light pipe has a light-extraction means along a first longitudinal side of the luminaire, which is confined to a radial swath of the luminaire, along the longitudinal axis of the luminaire, of substantially less than 180°. Angles passing through a first plane intersecting a radial center of the light-extraction means are termed alpha angles or alpha component angles; and angles passing through a second plane orthogonal to the first plane are termed beta angles or beta component angles. Alpha angles are referenced to the second plane and beta angles being referenced to the first plane. Light-saving means are included on the second end for directing saved light from the second end towards the first end, at redirection angles other than an excluded range of redirection angles, so long as the photon content of light at alpha redirection angles is at least 10 percent of the photon content of light at beta redirection angles. The excluded range of redirection angles is defined by:

$$|\beta_r| <= 20° \text{ and } |\alpha_r| < |\beta_r|/10,$$

where $\beta_r$ is the beta redirection angle and $\alpha_r$ is the alpha redirection angle.

Preferably, the light-saving means redirects saved light at alpha and beta redirection angles defined by the equation:

$$20 < \sqrt{\alpha_r^2 + \beta_r^2} < 60,$$

where $\beta_r$ is the beta redirection angle and $\alpha_r$ is the alpha redirection angle.

The foregoing inventive luminaires achieve a high efficiency, largely due to inclusion of light-saving means at the second end of the luminaire. Various embodiments of the invention also achieve a high degree of uniformity of illumination. This is true, although the inclusion of the light-saving means often requires a more careful patterning of the light-extraction means to achieve uniformity.

Other features and advantages of the invention will become apparent from the following specification in connection with the appended drawings.

DESCRIPTION OF THE PREFERRED EMBODIMENTS

Figure 1:
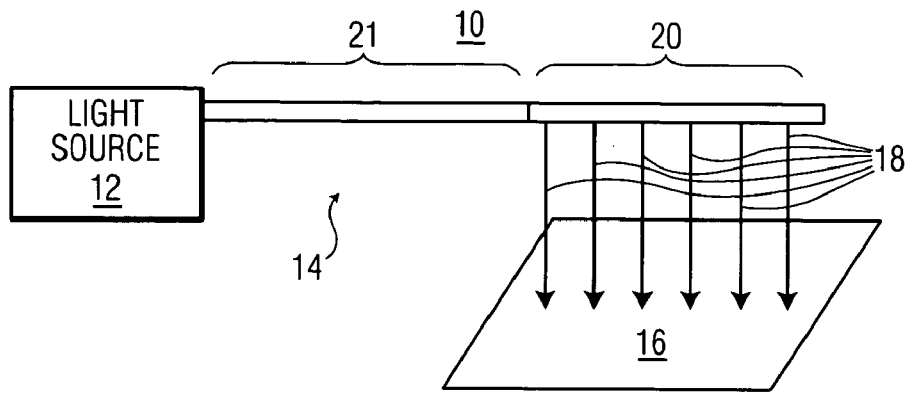
FIG. 1 is a simplified, schematic side view of a sidelight illumination system according to the present invention.

FIG. 1 shows a sidelight illumination system 10 showing the principle of extracting light from the side of a light pipe. System 10 includes a light source 12, a light pipe 14, and a target surface 16 to be illuminated. Arrows 18 show directional illumination of target surface 16 from a region 20 of light pipe 14 that emits light from the side of the light pipe. Side-light emitting region 20 is referred to herein as a "luminaire." Section 20 may comprise either a fraction of the length of light pipe 14 that is optimized to provide side light extraction, with some or all of the remaining section(s) (e.g., region 21) of the light pipe 14 optimized to transmit light along the longitudinal axis of the light pipe.

Figure 2A:
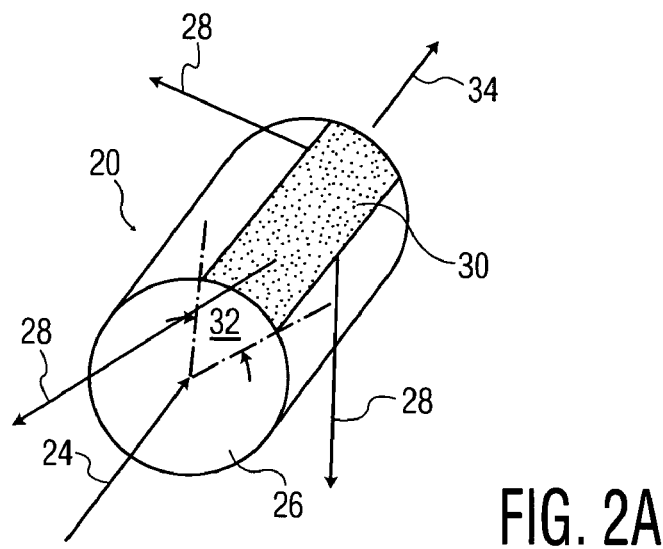
FIG. 2A is an isometric view of a section of luminaire 20 of FIG. 1, with a stippled region comprising light-extraction means.
Figure 2B:
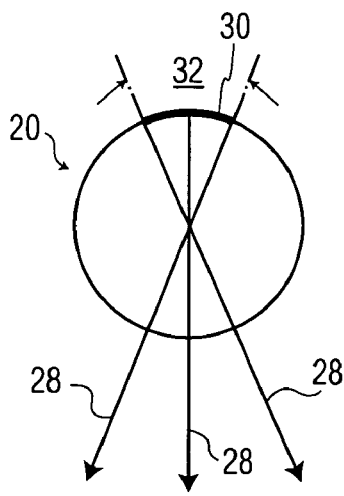
FIG. 2B is a simplified cross-sectional view of the luminaire of FIG. 2A.

FIG. 2A shows a light ray 24 entering a core 26 of luminaire 20 of FIG. 1. Light rays 28 pass in a preferential direction from the side of luminaire 20, due to the presence of light-extraction means 30, shown as a strip on luminaire 20. Light-extraction means 30 are shown stippled for convenience of illustration. The direction of light rays 28 can be more easily observed in FIG. 2B. As shown, light-extraction means 30 are confined to a radial swath 32 about the longitudinal axis of the luminaire, such radial swatch preferably being substantially less than 180°. Light ray 34 exits the end of luminaire 20, and represents residual light that has not exited the luminaire via the light-extraction means. It may be desirable to capture light ray 34, and redirect it back through luminaire 20.

Figure 3:
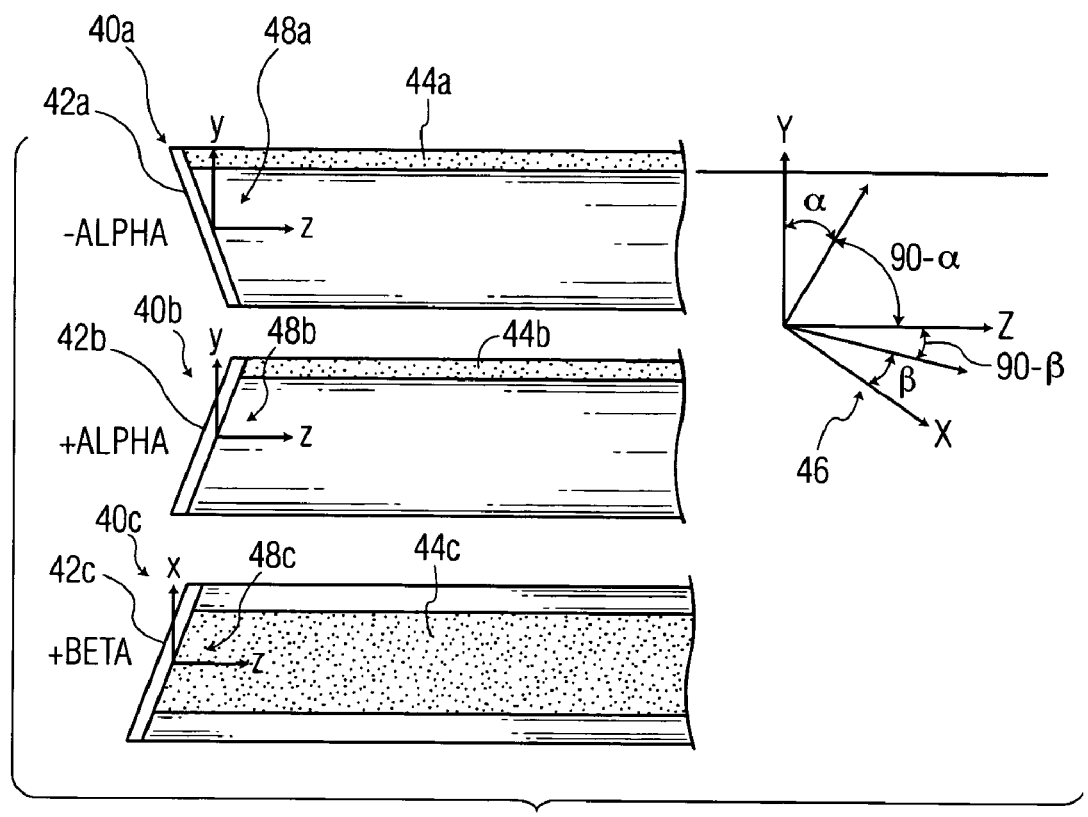
FIG. 3 are side views of three different luminaires, together with a three-axis legend, and with stippled regions comprising light-extraction means.

FIG. 3 shows one way to capture and redirect light rays such as light ray 34 in FIG. 2A. As shown in FIG. 3, one way to capture light ray 34 is with a mirror, such as shown on luminaires 40a, 40b and 40c in FIG. 3 as mirrors 42a, 42b and 42c, respectively. These mirrors may have specular reflecting surfaces, if desired. The angles made by mirrors 42a–42c with respect to the respective light-extraction means 44a, 44b and 44c significantly affects how light redirected back into the luminaires behaves optically. Accordingly, legend 46 shows mutually orthogonal X, Y and Z planes, corresponding to the X-Z axes shown in legends 48a and 48b on the left-shown ends of luminaires 40a and 40b. Similarly, legend 46 corresponds to the Y-Z axes shown in legend 48c, on the left of luminaire 40c.

Legend 46 shows alpha ($\alpha$) and beta ($\beta$) angles. Textual notations to the left of luminaires 40a–40c show, from top to bottom, mirrors 42a and 42b angled at plus (+) and minus (−) alpha angles, and mirror 42c angled at a plus (+) beta angle. With reference to FIG. 3, angles passing through a first plane (not shown) intersecting a radial center of the light-extraction means are termed alpha angles or alpha component angles; and angles passing through a second plane (not shown) orthogonal to the first plane are termed beta angles or beta component angles. Alpha angles are referenced to the second plane and beta angles being referenced to the first plane.

Figure 4:
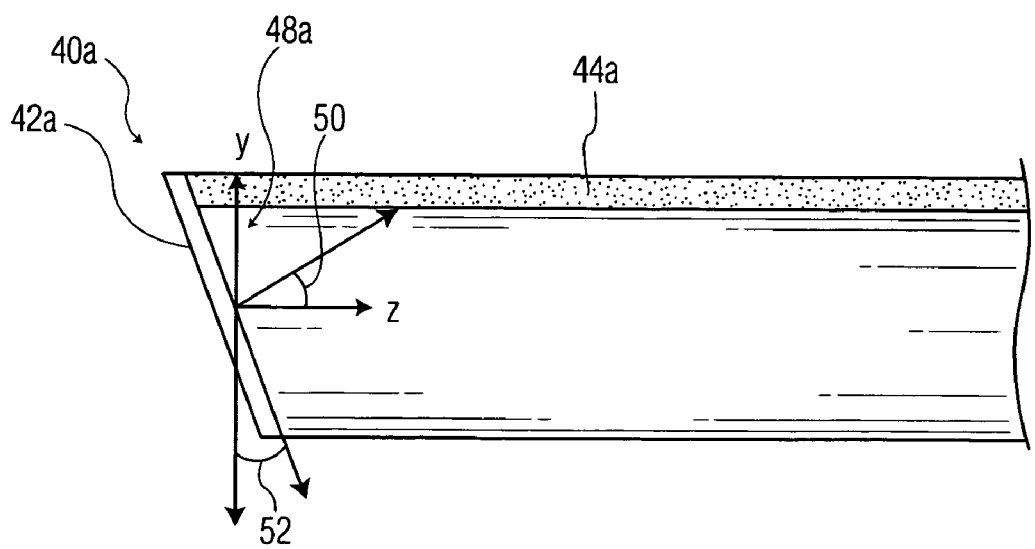
FIG. 4 is a side view of luminaire 40a shown in FIG. 3.

FIG. 4 clarifies the term "redirection" angle as used herein. In FIG. 4, showing luminaire 40a, angle 50 is the angle of light redirected by mirror 42a for an on-axis ray where the mirror is a specular mirror. Angle 50 is thus termed a "redirection" angle. Angle 52, in contrast, is termed a "tilt" angle, which is the angle made by the mirror with respect to the Y axis as shown in legend 48a. For a specular mirror 42a, the redirection angle is twice the tilt angle.

A flat mirror at the end of the luminaire is an example of a light saving means where the redirection angle is 0. With a flat mirror, there is a high probability of coupling light from the input end of the luminaire to the output end of the luminaire and then back the whole way to the input end. This flux can result in a loss of luminaire efficiency if that light couples back into the transport fiber 21 and/or the light source 12 of FIG. 1.

Preferred Redirection Angles

Figure 5:
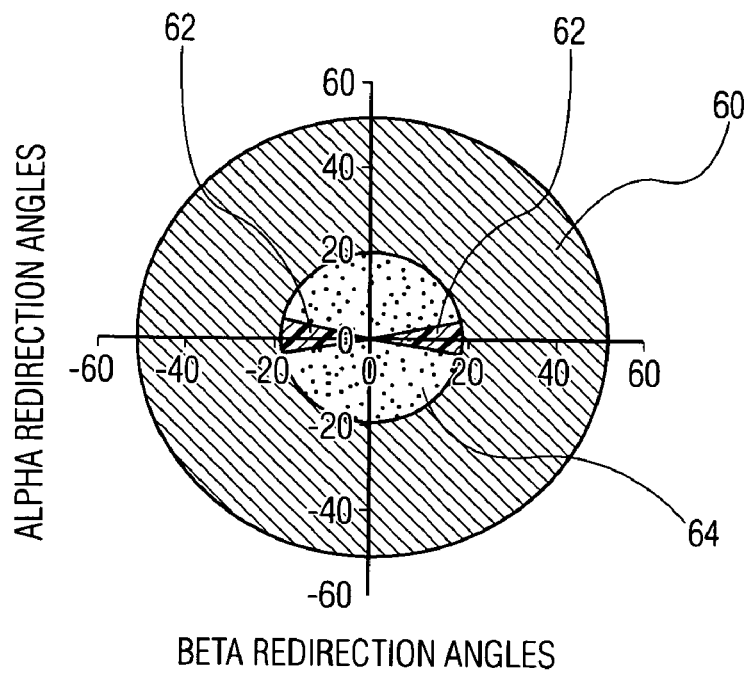
FIGS. 5 and 6 are plots of alpha redirection angles versus beta redirection angles.

The mirrors shown in FIGS. 3 and 4 serve as one type of light-saving means; that is, means for saving what otherwise would be wasted light (e.g., ray 34, FIG. 2A). Preferred redirection angles are shown in FIG. 5, which is a plot of alpha redirection angles versus beta redirection angles. The preferred angles comprise a doughnut-shaped area 60, shown cross-hatched, defined by the equation:

$$20 < \sqrt{\alpha_r^2 + \beta_r^2} < 60,$$

where $\beta_r$ is the beta redirection angle and $\alpha_r$ is the alpha redirection angle.

Two triangular shaped regions 62 are excluded from the preferred redirection angles. These regions 62 are defined by the equation:

$$|\beta_r| <= 20° \text{ and } |\alpha_r| < |\beta_r|/10.$$

Regions 62 represent the $\beta_r$ from −20 to +20° (i.e., $\beta$ from −10 to 10) taught by U.S. 5,857,761 to Abe et al. at Column 4, Lines 46–56, for instance, in which the alpha angles are zero, plus a tolerance band of alpha angles which increase at increasing beta angles. The Abe et al. patent states that (beta) mirror tilt angles greater than 10 degrees—according to the geometry defined in present FIG. 3—are unsuitable since it produces illumination "uneven along the radiation member," Col. 4, Lines 52–56. The other angles within the circular region 64, other than the foregoing exOcluded angles, are also preferred. Such angles are defined by:

$$0 < \sqrt{\alpha_r^2 + \beta_r^2} < 20$$

apart from the foregoing, excluded angles.

Figure 6:
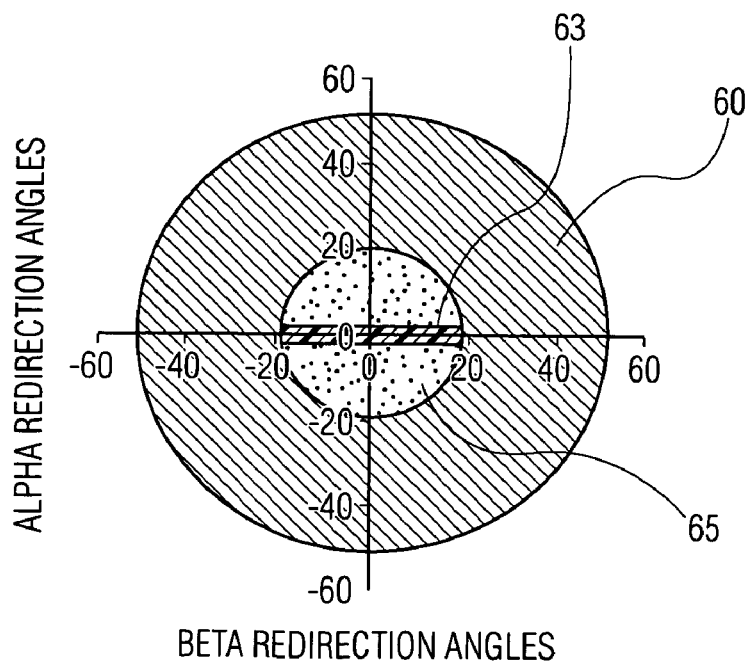

FIG. 6 shows other preferred and excluded redirection angles. It is similar to FIG. 5, but the excluded area 63 comprises a rectangle defined by: $\beta_r$ from −20 to +20°, and $\alpha_r$ from $-2°$ to $+2°$. This area is excluded to distinguish over the $-10$ to $+10$ beta angles of the cited Abe et al. patent, with a different alpha tolerance band used. The tolerance allowed is plus or minus 1° alpha. Area 60, as in FIG. 5, shows preferred angles. Area 65 also shows preferred angles, and excludes rectangular area 63.

A particularly preferred range of redirection angles is from $-20$ to $-30$ (and most preferably $-25$) alpha redirection angles, with beta redirection angles being negligible.

In addition to the preferred ranges of alpha and beta redirection angles described above, to further distinguish over the cited patent to Abe et al., the condition is preferred that the photon content of light at alpha redirection angles is a substantial percentage of the photon content of light at beta redirection angles. That percentage is preferably 10, although it could also be 20, 30 or 40.

Applications

Figure 7A:
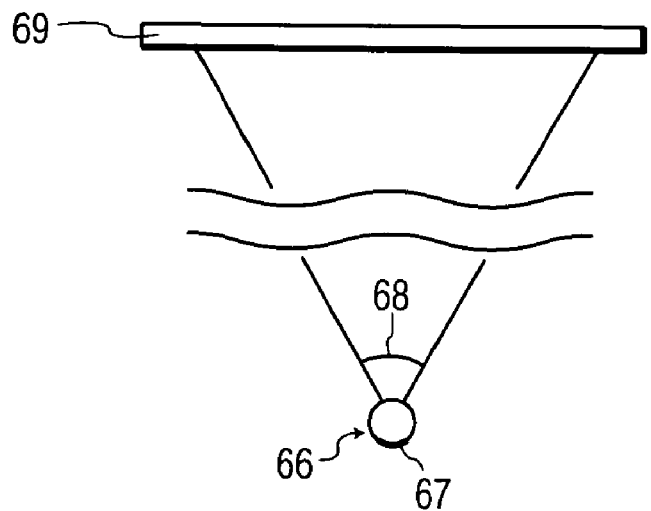
FIG. 7A is an end view of a luminaire and a target region to be illuminated.
Figure 7B:
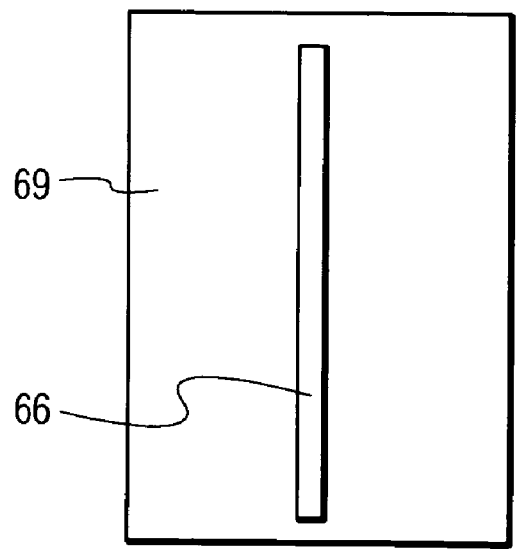
FIG. 7B is a side view of the structures of FIG. 7A.

One application for luminaires of the present invention is shown in FIGS. 7A and 7B. In these figures, a luminaire 66 having light-scattering means 67 directs light at an angle 68 to a target region 69. The radial swath 67 of light-extraction means is related to the size of the illumination pattern perpendicular to the long axis of the luminaire. In general, narrow radial swaths produce narrow illumination patterns and wide radial swaths produce wide illumination patterns. The radial swath of light-extraction means may preferably be from 60 to 130° for a luminaire 6 feet away from a target region to be illuminated. Where a luminaire is 20 feet above a larger-sized target region to be illuminated, a preferred radial swath may be from 20 to 90°. Given the shape of the light pipe used in the luminaire, a person of ordinary skill in the art will find it routine to select an appropriate radial swath based on the region to be illuminated and the distance from a luminaire (or luminaires), based on the present specification. The cross sectional shape of the luminaire is preferably round but could be shaped so as to provide further control over the illumination distribution produced by the luminaire. Secondary optics, such as lens arrays, cylindrical lens, and Fresnel lenses can be combined with the side lighting light pipe.

For increasing efficiency of lighting by a luminaire with a 90° swath width, it is desired that the ratio of luminaire length to the maximum cross-sectional dimension of the luminaire exceed 20, and preferably exceeds 30. This helps to ensure that a high fraction of the light entering the luminaire will strike the extraction pattern and thereby provide high efficiency.

Figure 8A:
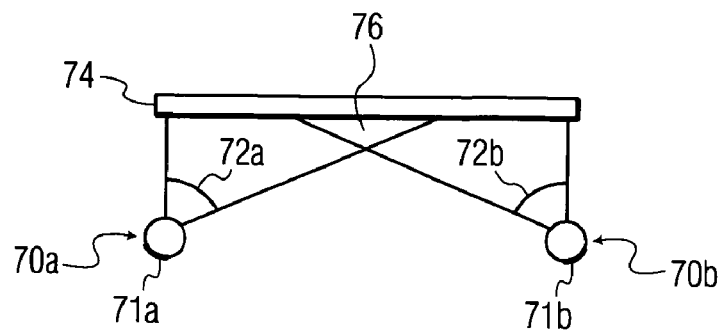
FIG. 8A is an end view of a pair of luminaires and a target region to be illuminated.

Another application for luminaires of the invention is shown in FIG. 8A as a plurality of luminaires, for instance, 70a and 70b, having respective light-scattering means 71a and 71b for directing light towards a target region 74. Angles 72a and 72b are preferably in the range from 20 to 60°. However, the light is not strictly confined to within angles 72a and 72b. Luminaires 70a and 72a cooperate with each other by both providing light in area 76 of region 74, so that the target region 74 is more uniformly illuminated. However, more than two luminaires can be used in this application, if desired.

Figure 8B:
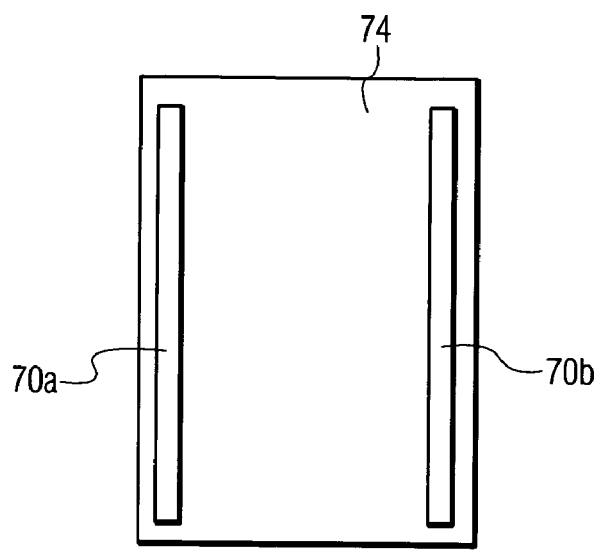
FIG. 8B is a side view of the structures of FIG. 8A.

FIG. 8B shows a side view of the luminaires 70a and 70b and target region 74. Region 74 may be food in a in a cooler or freezer case in a grocery store, for instance. Luminaires 70a and 70b provide lighting for the food, in an energy efficient but, more importantly, a low maintenance manner compared to conventional fluorescent lighting, for instance.

There are two areas where maintenance is reduced when replacing fluorescent tubes in cooler or freezer case with the present luminaire.

The low temperature environment is one area. Fluorescent lights do not perform well in low temperature environments. In cooler cases, all fluorescent bulbs are surrounded by a protective, air-tight covering that seals out the cold and provides some self-heating from the bulb itself. The heat is needed to keep the mercury in vapor phase in the tube. If the seal is broken, heat escapes and the bulb generates significantly less light. Any time the bulb is changed or the fixture is physically shaken, there is a risk that the seal could be broken. To replace or repair the seal, the contents of the case would most likely need to be removed. Beneficially, the present luminaire does not have the same constraints; it will function the same way inside a cooler or freezer case or outside. No seals are required to sustain a workable temperature environment in the cooler case.

Tube breakage is the second area in which the present luminaire results in less maintenance. There is a significant risk of bulb breakage when fluorescent tubes are replaced in cooler or freezer cases. Because of that risk, such cases are typically emptied of food before the bulb is replaced. This reduces the risk of glass and mercury contamination of the food stuff. This is a costly, time-consuming operation that will be eliminated with the use of the present luminaire, since no glass or mercury is used. In the event that a tube does break in the cooler or freezer case, the goods become contaminated with glass and are presumed contaminated with mercury and so must be discarded. This is costly as well.

The present luminaires do not need to be replaced except in the rare case where one becomes broken. The light source for the present luminaires are outside of the cooler or freezer case and can easily be replaced without shutting down and emptying the case and without the need of entering the case.

As one example of an application of FIGS. 8A and 8B, with target regions 76 being 2.5 feet wide, luminaires 70a and 70b are set in from either side by one inch (see FIG. 8B). Target region 76 is 6 inches from the centers of the luminaires (see FIG. 8A). Each luminaire has a 12 mm diameter. Typically, each luminaire has a radial swath significantly less than 90°. This makes the angular distribution of the light in the across-luminaire direction reasonably narrow. As will be apparent from FIG. 8A, the luminaires can then be aimed via rotating them about their respective optical axes. The illuminance distribution is then a superposition of the patterns generated by each of the two individual luminaires, and can be designed so as to be uniform.

The generally parallel arrangement of luminaires of FIGS. 8A and 8B may be used in other applications, as will be apparent to those of ordinary skill in the art. For instance, it may be used in a jewelry or museum display case, by way of example.

Further Light-Saving Means

Figure 9:
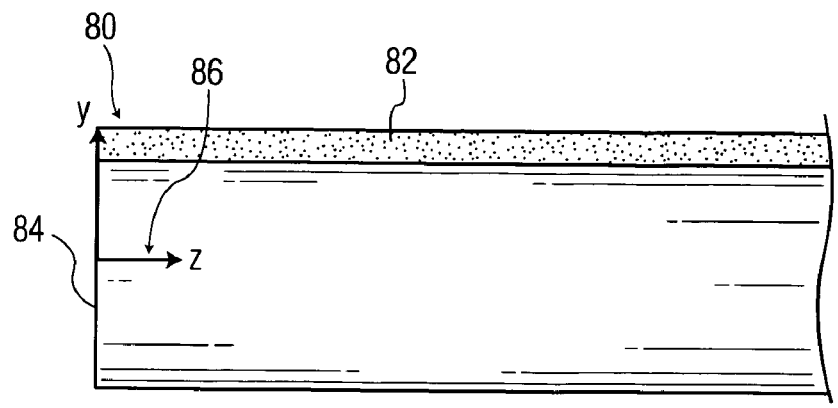
FIG. 9 is a side view of a luminaire having a roughened surface at its second end.
Figure 10:
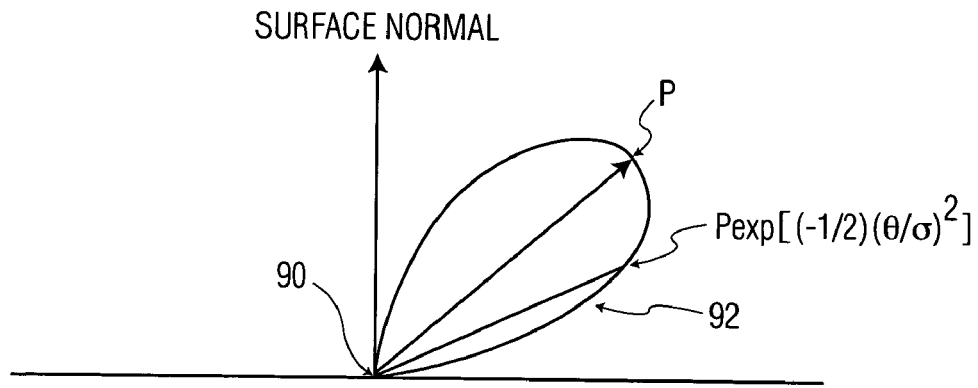
FIG. 10 is a graph of optical properties of the roughened surface shown in FIG. 9.

In addition to the use of flat specular mirrors for light-saving means described above (e.g., 42a, FIG. 3), a redirection means, which redirects the light over a range of angles, may be used, as described in FIGS. 9 and 10. In FIG. 9, a luminaire 80 with light-extraction means 82 includes a nominally flat but roughened surface 84 according to the geometry indicated by Y-Z axes legend 86. Roughened surface 84, located at the "second" end of the luminaire (as used herein), can be adjusted to redirect light over a range of angles with more directionality than a diffuse reflector but less directionality than a specular mirror. An alternative embodiment that redirects light over a range of angles would be a holographic diffuser combined with a specular mirror. Yet another embodiment would be to stipple the end face of the luminaire and then use a specular mirror.

Although there are many redirection distributions that a non-specular end surface can produce, a Gaussian scatter distribution is a typical shape. A Gaussian redirection distribution can be described according to the following equations:

$$\text{Redirection}(\alpha_r, \beta_r) = P_o \exp\left(-\frac{1}{2}\left(\frac{\alpha_r^2 + \beta_r^2}{\sigma^2}\right)\right)$$

where $\sigma$ is a parameter that controls the width of the scatter distribution and $P_o$ is a constant for a given value of $\sigma$ and total reflectivity. $\sigma$ of about 15° provides a reasonable compromise between a diffuse reflector that redirects light to angles that are too large and a specular mirror with a 0° tilt that does not provide sufficient redirection of the light.

FIG. 10 depicts the reflected scatter distribution when a ray hits the end mirror at and off-axis angle.

Figure 11:
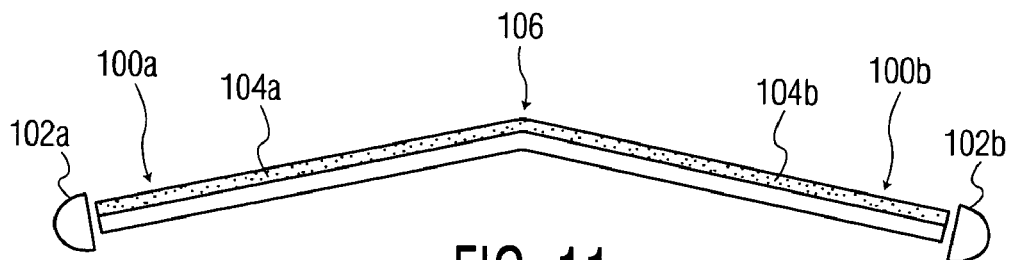
FIG. 11 is a side view of a pair of integrally joined luminaires.

Another form of light-saving means can be formed as shown in FIG. 11. FIG. 11 shows a pair of luminaires 100a, 100b, each having a respective light source 102a, 102b, at its "first" end (as used herein). Luminaire 102a has light-extraction means 104a, and luminaire 100b has light-extraction means 104b. A light-saving means 106 constitutes a bend region at the respective second ends of the pair of luminaires 100a, 100b. Thus, light from light source 102a that does not exit luminaire 100a via light-extraction means 104a is "redirected" into luminaire 100b as saved light. This avoids wasting light.

Other

Figure 12:
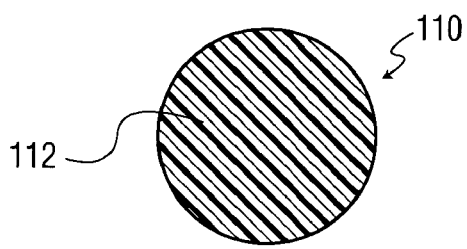
FIGS. 12 and 13 are cross-sectional views of luminaires.
Figure 13:
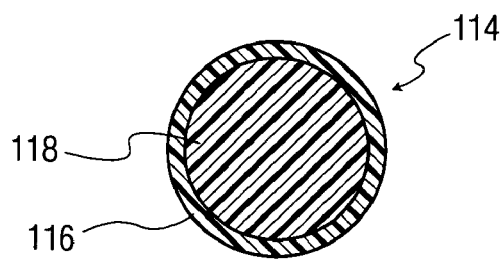

Regarding preferred constructions of luminaires, FIG. 12 shows a luminaire 110 having a core 112. FIG. 13 shows a contrasting luminaire 114 having a core 116 and also a transport cladding 118. Luminaire 110 of FIG. 12 relies on a "cladding" consisting of air. Typically, transport cladding 118 of FIG. 13 will have an index of refraction substantially larger than that of air but substantially less than that of the core. Luminaire 110 of FIG. 12 is free of such a transport cladding. The use of a non-absorbing transport cladding as in FIG. 13 can typically result in about one percent efficiency increase over the use of an air cladding as in FIG. 12.

Preferably, the core of each of the luminaires of FIGS. 12 and 13 comprises an acrylic polymer or quartz. The core material will be chosen from material that possesses a low coefficient of light absorption to maximize the light throughput of the material, so as to maximize efficiency. High quality optical grade quartz is very efficient, with a low light absorption coefficient. However, this material is easily broken. It has been found that some acrylic polymer materials also have low light absorption coefficients and make highly efficient luminaire devices. Such materials will be apparent to those of ordinary skill in the art.

Uniformity of Illumination—Patterning Light-extraction Means

A concern arises with increasing the efficiency of illumination by incorporating light-saving means in luminaires. Increasing the efficiency often makes it more difficult to achieve uniformity of illumination. Typically, the present invention will achieve high uniformity of illumination, for instance, with illuminance over each of each sequential 5 percent length of a luminaire being uniform to within 10 percent of the average illuminance along the length of the luminaire. The present invention can achieve high uniformity by carefully controlling the profile of light-extraction efficiency of light-extraction means along the length of a luminaire.

Figure 14A:
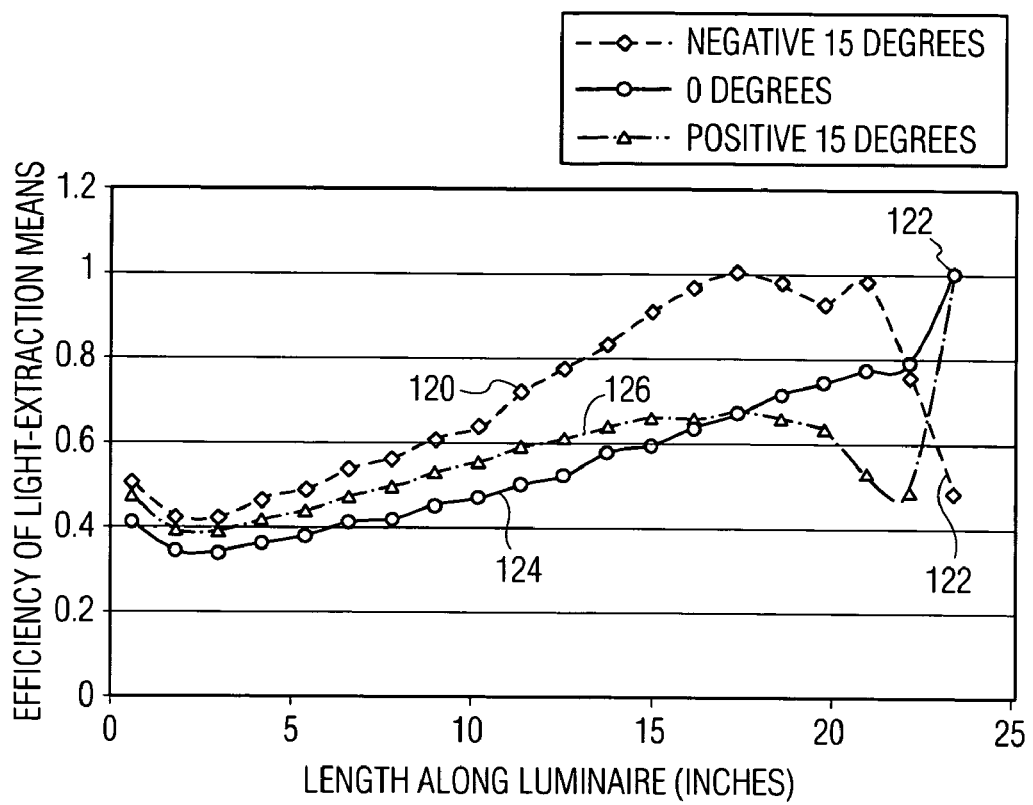
FIG. 14A is a plot of light-extraction efficiency versus length along a luminaire for different tilt angles of a mirror serving as a light-saving means.

FIG. 14A plots light-extraction efficiency versus alpha tilt angles of a mirror at the second end of a luminaire (e.g., mirror 42a, FIG. 3), for achieving high uniformity of light for a 610 mm-long, round luminaire with a 19 mm diameter and an 85-° radial swath width. The flux entering the luminaire is coupled from a light source (not shown) to the luminaire using a cladded transport fiber. The light source has an intensity distribution 128 as shown the plot of FIG. 14B. As apparent from the above description, the tilt angle of a mirror results in a twice-as-large angle of light "redirected" by the mirror. The extraction efficiency curves of FIG. 14A for achieving high uniformity of light are now explained in more detail.

As shown in FIG. 14A, for an alpha tilt angle of −15, curve 120 shows that the efficiency will have a non-monotonic pattern, with the extraction efficiency 122 at the end of a luminaire being less than maximum. For a tilt angle of 0° alpha, curve 124 shows that the efficiency of light extraction need only increase substantially monotonically to a peak at 122 (second end of luminaire). For a tilt angle of +15° alpha, curve 126 shows that the light-extraction efficiency increases non-monotonically, with such efficiency reaching a peak at 122 (second end of a luminaire).

A preferred way of arriving at a profile for light-extraction efficiency along the length of a luminaire is to use an iterative design approach, testing each iterative design with appropriate light-modeling software. This approach is described in a paper by W. J. Cassarly and B. Irving, "Noise tolerant illumination optimization applied to display devices," Proc. SPIE, Vol. 5638, Pages 67–80, Feb. 2005. This paper describes an iterative approach to adjusting the extraction pattern so as to achieve a desired spatial illumination distribution. The illumination output distribution for a starting extraction pattern is used to reduce the extraction where the illumination output is too high and increase the extraction where the illumination output is too low. Once adjustments to the extraction pattern are made, the illumination output is recomputed and a new extraction pattern is estimated. This procedure is repeated iteratively. After a number of iterations, the extraction pattern required to achieve the specified spatial illumination distribution is obtained. One example commercial software package that can be used to compute the illumination output distribution is LightTools® software by Optical Research Associates of Pasadena, Calif.

Figure 15A:
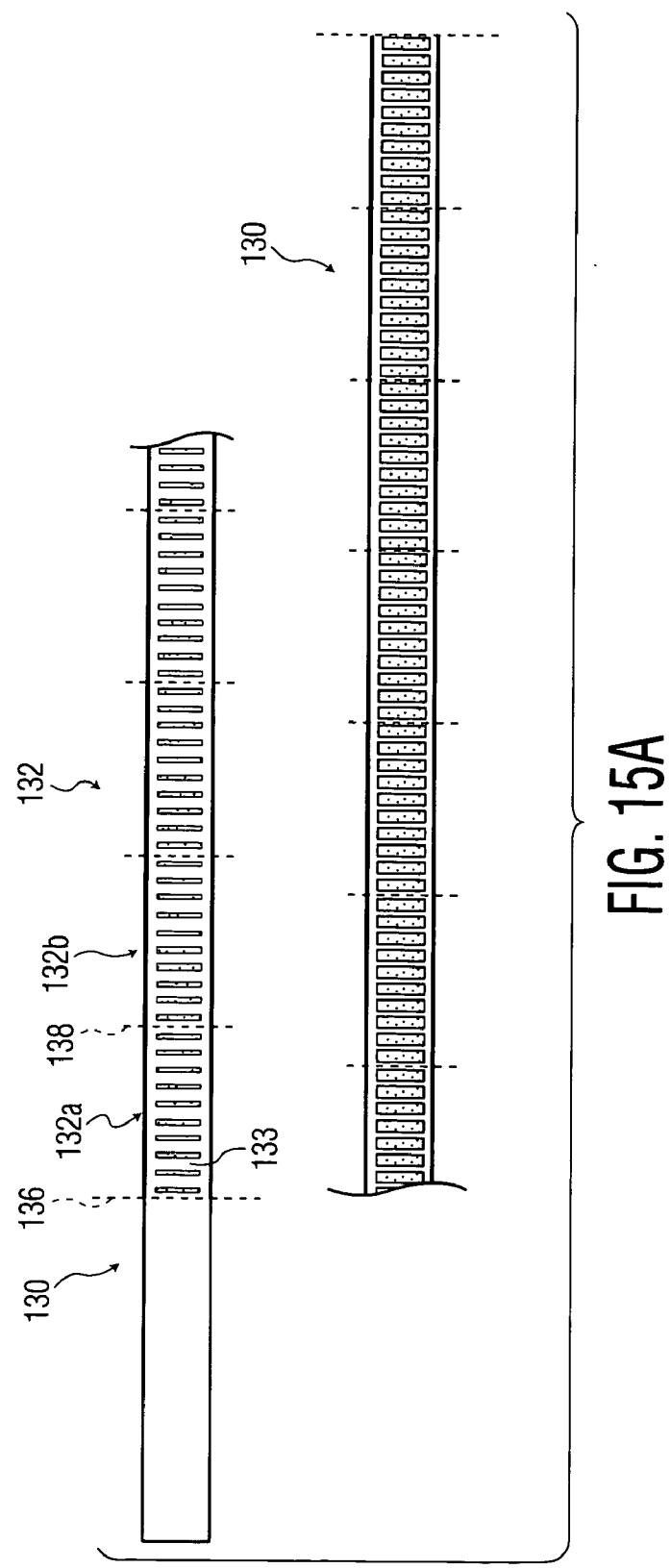
FIG. 15A shows two sections of a single light pipe with a luminaire section light-extraction means in a varying pattern of light-extraction efficiency.

One particular pattern of light-extraction means is shown in FIG. 15A. FIG. 15A shows two sections of a luminaire 130 with a pattern of light-extraction means 132. For illustration of the variation in extraction density along the length of the luminaire, light-extraction means 132 are shown as rectangular stripes orthogonal to the length of the luminaire. Means 132 could be a suitable paint containing light-extraction particles, as explained below, by way of example. The dominant factor when using paint is the density of the paint pattern, not the shape of each painted region. This means that circular, oval, rectangular, or any other shape that can be applied in a controlled manner can be used.

In FIG. 15A, light-extraction means 132 are divided into twenty sections 132a, 132b, etc. Phantom lines 136 and 138 mark the beginning and end of section 132a of the light-extraction means. Each section (e.g., 132a) of the light-extraction means has the same light-extraction efficiency along its length. It is preferred for uniformity of light illumination that the gaps (e.g., 133) in the light-extraction means along the length of the luminaire are less than about 20 percent of the diameter of the light pipe. Much smaller gaps are used when it is desired to minimize the structure observed when looking back into the luminaire. The pattern of light-extraction means of FIG. 15A correlates mostly with curve 124 of FIG. 14A.

Preferably, a pattern of light-extraction means such as shown in FIG. 15A achieves uniformity of light extraction such that the following relation applies: average Illuminance over each of each sequential 5 percent length of the luminaire—given that twenty sections might be used—is uniform to within 10 percent of the average illuminance along the length of the luminaire.

Figure 14B:
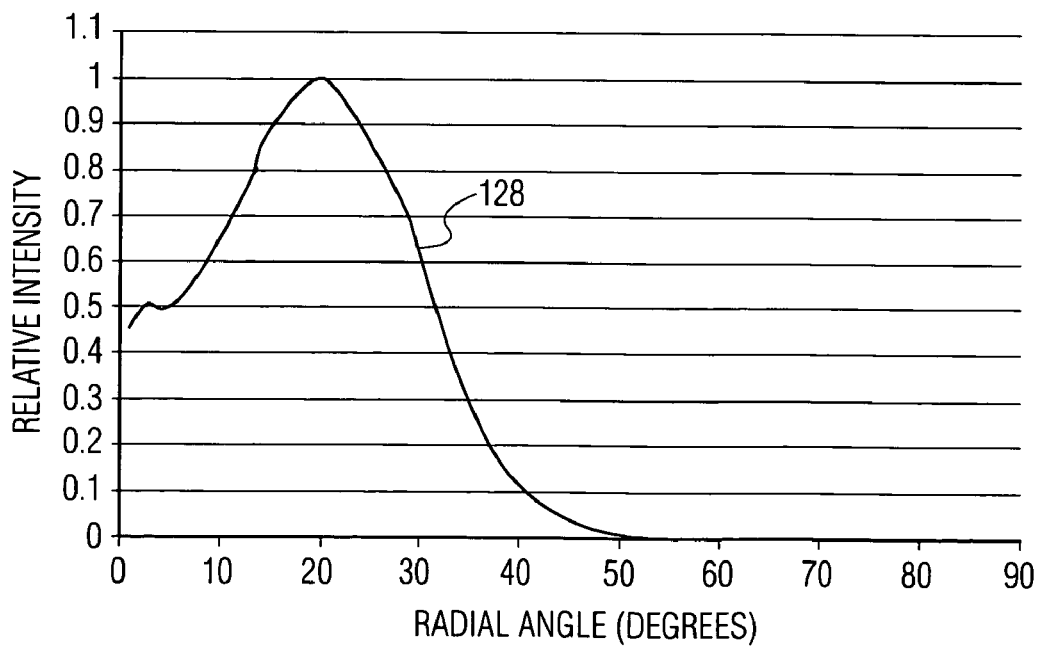
FIG. 14B is a plot showing the intensity distribution for the light source used to generate the data of FIG. 14A.
Figure 15B:
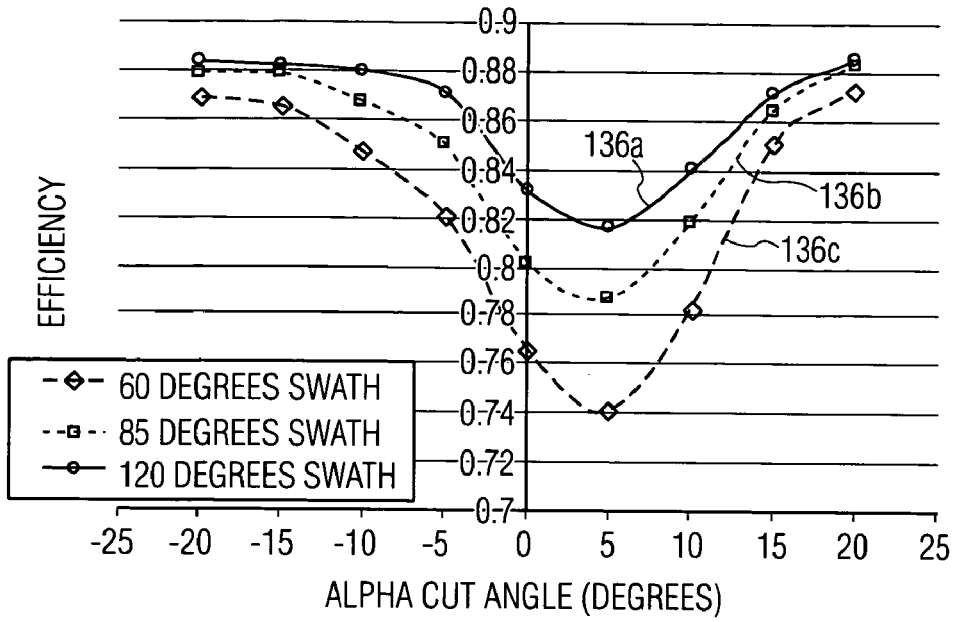
FIG. 15B is a plot showing relative efficiency versus end tilt angle of a mirror.

FIG. 15B shows light extraction efficiency as a function of the alpha cut tilt angle of a flat mirror. Curves 136a, 136b and 136c respectively represent light-extraction means swath widths of 60°, 85°, and 120°. Each one of the points making up the curves on the plot corresponds to a specific pattern of light-extraction means (and mirror tilt angle) for a 610 mm long, round luminaire. The luminaires have 19 mm diameters, and the intensity distribution of the source is shown in FIG. 14B above.

There are several points that can be inferred from FIG. 15B. One important point is that efficiency tends to increase with swath width over the range of three swaths shown. Additionally, the data show that for this type of luminaire, there is more advantage in tilting the end mirror when the swath width is smaller. For instance, for the 60°swath width case, a change in alpha tilt angle from 0° to +/−20° results in about ("~") 10% more source flux exiting the luminaire. Another point to observe is that the low point in the efficiency does not occur at alpha tilt angle=0°, and in fact small positive alpha tilts result in loss of efficiency. A final point is that the efficiencies with a large tilt angle all approach 90%. If a longer luminaire (or smaller radius) is used, this efficiency can be increased to over 90%.

Figure 15C:
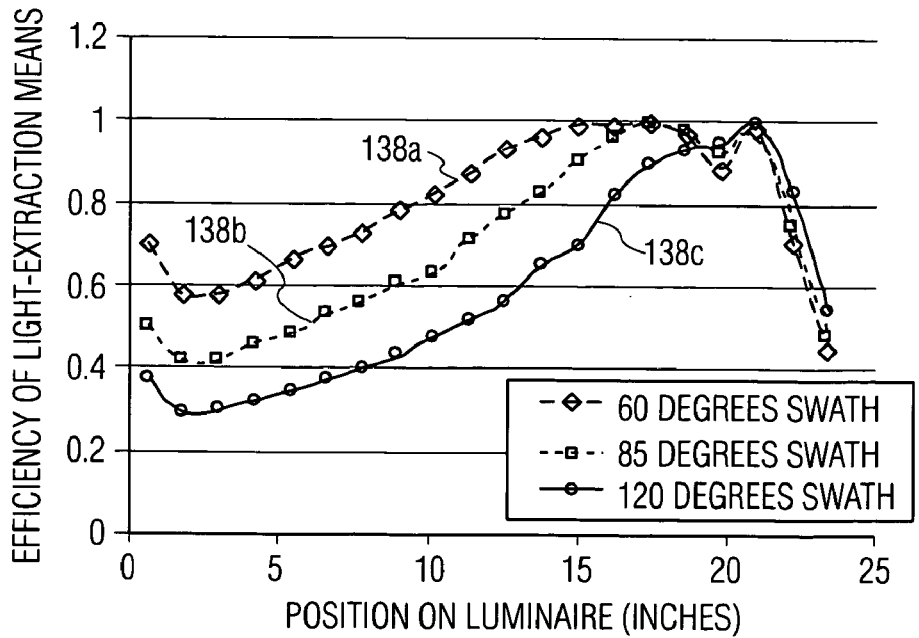
FIG. 15C is a plot of relative efficiency of light-extraction means versus length of a luminaire for different radial swaths of light-extraction means.

As stated above, each point on the curves shown in FIG. 15B represent a different luminaire design. FIG. 15C shows the design cases for alpha mirror tilt angle=−15°. Curves 138a, 138b and 138c are profiles of efficiency of light-extraction means along the length (shown in inches) on the luminaire surface for the 60°, 85°, and 120° swath-width cases, respectively. These curves are shaped similar to each other, and it can be seen that higher overall efficiencies of light-extraction means are required for lower swath widths.

In some embodiments of the inventive luminaire, a reflector can be used for enhancing the directionality of the light extracted from the luminaire. FIG. 16B shows a reflector which provides higher efficiency than the reflector in FIG. 16A.

Figure 16A:
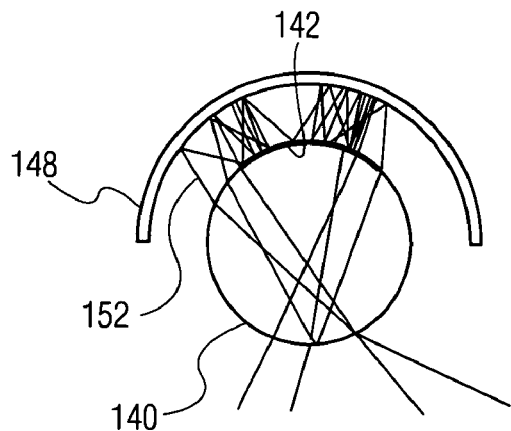
FIGS. 16A and 16B show cross-sectional views of luminaires with an undesired reflector and a desired reflector, respectively.
Figure 16B:
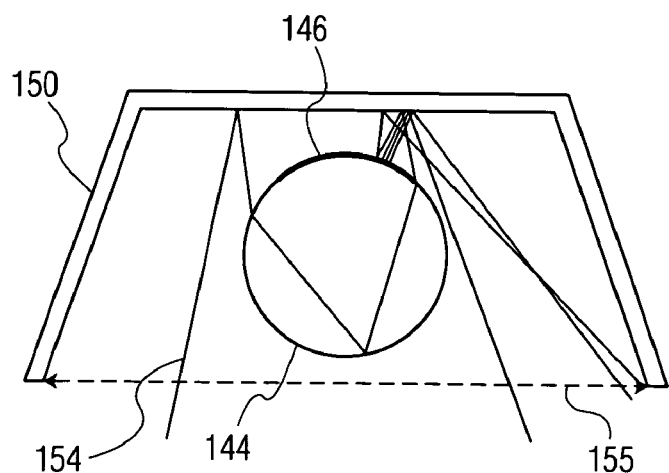

FIG. 16A shows a luminaire 140 with light-extraction means 142. FIG. 16B similarly shows a luminaire 144 with light-extraction means 146. FIG. 16A shows an undesired reflector 148, which is specular and concentric with the light pipe. For illustration purposes, the reflector is shown with a gap between the light pipe and the reflector. As shown by ray tracings 152, the specular nature of reflector 142 increases the chances of light rays exiting vertically upwards from the light-extraction means going back through the light-scattering means or through the remainder of the luminaire. If light travels back through the light-scattering means, a portion of it is lost, reducing illumination efficiency.

In FIG. 16B, a desired reflector 150 is used. Reflector 150 has a non-specular, diffuse reflecting surface and the reflector is shifted away from the light pipe. Such a surface and geometry decreases the chances that light will reflect from the reflector but not pass back through the light-extraction means or through the remainder of the luminaire. Specular reflectors with shapes designed to minimize the flux restriking the light pipe can also be used efficiently.

In FIG. 16B, luminaire 144 could be inverted so that light-extraction means is on the underside of the luminaire. In such an arrangement, the reflector can be shaped to impart directionality to the resulting light beam.

Figure 17:
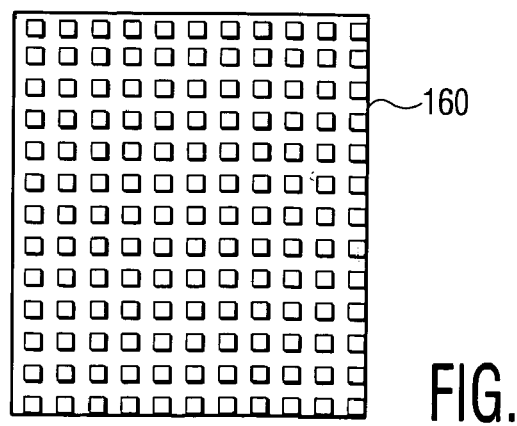
FIG. 17 is a textured pattern of light-scattering means.

FIG. 17 shows a preferred textured pattern for light-extraction means. Such pattern could be formed from depressions on the surface of a luminaire or bumps on such surface, or both. Other patterns can also be used to achieve a desired extraction efficiency. For example, hexagonal patterns using hemispherical depressions can be used to maximize the density of the extractors.

Figure 18:
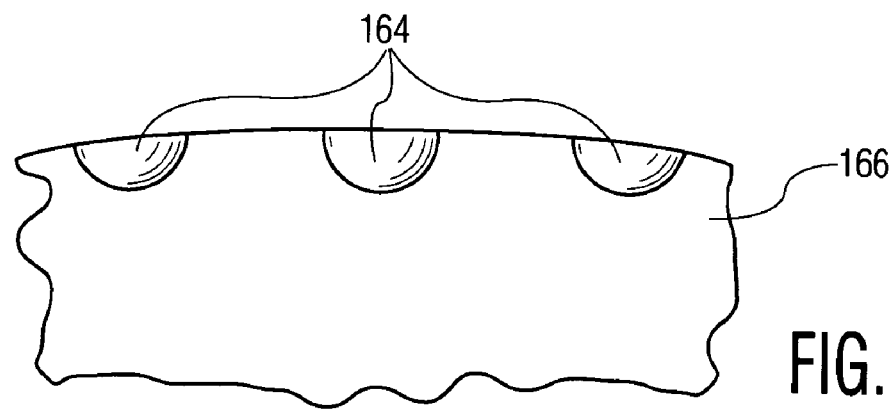
FIG. 18 is a cross-sectional view of a small section of the surface of a luminaire, greatly magnified, showing a textured pattern.
Figure 19A:
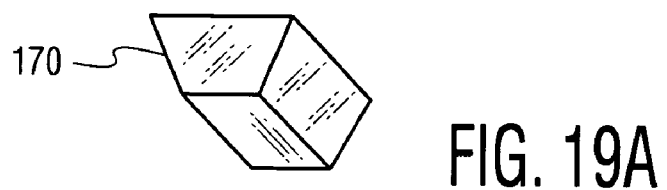
FIGS. 19A–19D show alternative shapes that can replace the hemispherical shapes of FIG. 18.
Figure 19B:
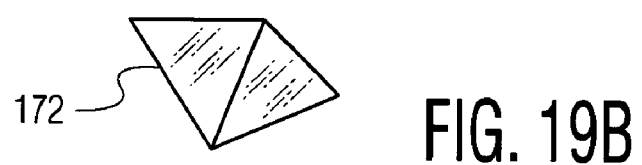
Figure 19C:
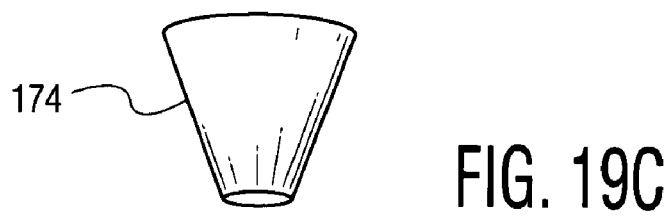
Figure 19D:
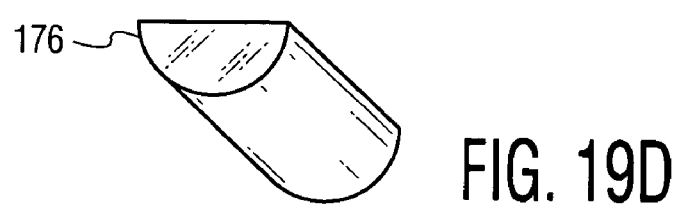

FIG. 18 shows three hemispherical depressions 164 in the surface of a luminaire 166. Many such hemispherical depressions can create a light-extraction means on the luminaire. Other shapes for depressions, as shown in FIGS. 19A-19D, respectively comprise a prism, a pyramid, a cone or a cylinder.

Alternatively, the hemispherical shapes 164 in FIG. 18 and the other shapes of FIGS. 19A–19D can be inverted vertically and form bumps on the surface of luminaire 166 of FIG. 18.

Figure 20:
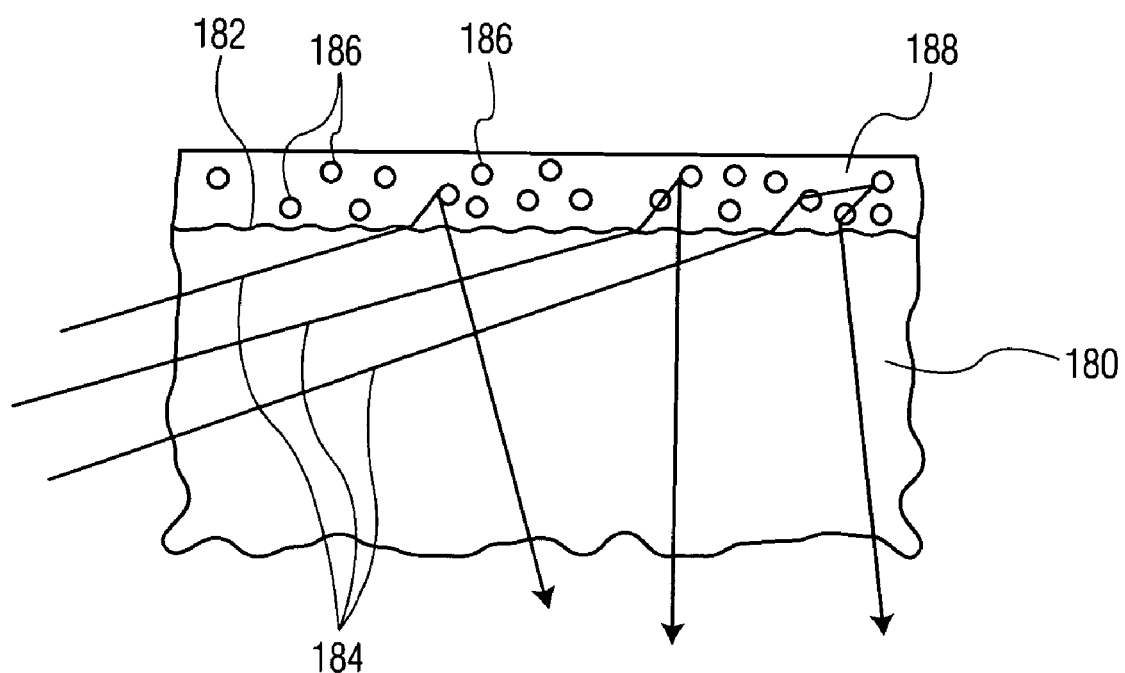
FIG. 20 is a sectional view of a light pipe with light-extraction means comprising two modalities.

FIG. 20 shows a luminaire 180 having two types of light-extraction means. First, a roughened surface 182, which may be formed by chemical etching, helps to extract light from the luminaire. This is shown by light rays 184 which intercept roughened surface 182, and are directed upwardly. Second, light-extraction particles 186 in a layer of paint 188 then serve to direct light downwardly If desired, roughened surface 182 may be used alone; that is, without also including paint layer 188.

Light-Scattering Means

A preferred light-scattering means (e.g., 30, FIG. 2A) comprises a layer of paint exhibiting Lambertian-scattering and having a binder with a refractive index about the same as, or greater than that of, the core. Suitable light-scattering particles are added to the paint, such as titanium dioxide or many other materials as will be apparent to those of ordinary skill in the art. Preferably, the paint is an organic solvent-based paint.

Three paints that have performed well are as follows: (1) An oil-based paint with an alkyd binder, sold by Flamuco GmbH, Munich, Germany, under the brandname CUSTO-DIN, with Art. No. 52029 performed well. The foregoing company has apparently been acquired Brillux GmbH & Co. KG of Munster, Germany. The paint solids contain approximately 41 percent by weight titanium dioxide particles, which serve as light-scattering particles, and approximately 59 percent by weight alkyd binder. (2) A second oil-based paint sold by Nazdar of Shawnee, Kans., as "9775 Super Opaque White" from the 9700 series of "All Purpose Screen Ink", also performed well. (3) A third oil-based paint supplied by Sherwin Williams of Cleveland, Ohio, as aerosol paint with $T_iO_2$ pigment, also performed well.

Light-scattering means of the foregoing type of paint can be applied to a luminaire by first applying a stencil to the luminaire. The stencil has cut-out portions corresponding to the desired pattern of light-scattering means (e.g., 132, FIG. 15A). Then, paint is applied to the exposed areas of the luminaire, and the stencil removed.

An alternative way to apply light-scattering means to a luminaire is to apply vinyl sticker material in the desired shape of light-scattering means to the luminaire. Appropriate vinyl stickers have been supplied by Avery Graphics, a division of Avery Dennison of Pasadena, Calif. The film is an adhesive white vinyl film of 0.146 mm, typically used for backlit signs.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A luminaire with directional sidelight extraction, comprising:
   a) a light pipe with a light-carrying core; the light-pipe having a first end in which light from a first light source is received, a second end, and a longitudinal axis;
   b) light-extraction means on the surface of the core of the light pipe, along a first longitudinal side of the luminaire; the light-extraction means being confined to a radial swath of the luminaire, along the longitudinal axis of the luminaire, of substantially less than 180°;
   c) angles passing through a first plane intersecting a radial center of the light-extraction means being termed alpha angles or alpha component angles; and angles passing through a second plane orthogonal to the first plane being termed beta angles or beta component angles;
   d) light-saving means on the second end for directing saved light from the second end towards the first end, at redirection angles other than an excluded range of redirection angles, so long as the photon content of light at alpha redirection angles is at least 10 percent of the photon content of light at beta redirection angles, where the excluded range of redirection angles is defined by:

$|\beta_r| <= 20°$ and $|\alpha_r| < |\beta_r|/10$, where $\beta_r$ is the beta redirection angle and $\alpha_r$ is the alpha redirection angle.

2. A plurality of luminaires with directional side-light extraction, each luminaire comprising:
   a) a light pipe with a light-carrying core; the light-pipe having a first end in which light from a first light source is received, a second end, and a longitudinal axis;
   b) light-extraction means on the surface of the core of the light pipe, along a first longitudinal side of the luminaire: the light-extraction means being confined to a radial swath of the luminaire, along the longitudinal axis of the luminaire, of substantially less than 180°;
   c) angles passing through a first plane intersecting a radial center of the light-extraction means being termed alpha angles or alpha component angles; and angles passing through a second plane orthogonal to the first plane being termed beta angles or beta component angles;
   d) light-saving means on the second end for directing saved light from the second end towards the first end, at redirection angles other than an excluded range of redirection angles, so long as the photon content of light at alpha redirection angles is at least 10 percent of the photon content of light at beta redirection angles, where the excluded range of redirection angles is defined by:

$|\beta_r| <= 20°$ and $|\alpha_r| < |\beta_r|/10$, where $\beta_r$ is the beta redirection angle and $\alpha_r$ is the alpha redirection angle;
   e) each luminaire being spaced apart from each other in generally parallel fashion with the light-extraction means from each luminaire directing some portion of light towards the same target area.

3. The luminaire of claim 2, wherein the plurality of luminaires is a pair of luminaires.

4. The luminaire of claim 1 or 2, wherein for each mentioned luminaire the light-saving means redirects saved light at alpha and beta redirection angles defined by the equation:

$20 < \sqrt{\alpha_r^2 + \beta_r^2} < 60$, where $\alpha_r$ is the beta redirection angle and $\alpha_r$ is the alpha redirection angle.

5. The luminaire of claim 1 or 2, wherein for each mentioned luminaire light-saving means redirects saved light at alpha redirection angles in the range from −20 to −30° with beta redirection angles being negligible.

6. The luminaire of claim 1 or 2, wherein for each mentioned luminaire the respective radial swath is between 20 and 60°.

7. The luminaire of claim 1, wherein for each mentioned luminaire the radial swath is from 60 to 130°.

8. The luminaire of claim 1 or 2, wherein for each mentioned luminaire the ratio of length to maximum cross-sectional dimension of the luminaire exceeds 20.

9. The luminaire of claim 1 or 2, wherein for each mentioned luminaire the second end of the luminaire has a mirror for reflecting back into the luminaire light received by the mirror.

10. The luminaire of claim 9, wherein for each mentioned luminaire the mirror is flat.

11. The luminaire of claim 9, wherein for each mentioned luminaire:
    a) the mirror is substantially orthogonal to the longitudinal axis;
    b) the mirror has a non-specular but not completely diffuse surface for redirecting light over a range of angles.

12. The luminaire of claim 11, wherein for each mentioned luminaire the redirected angles have a Gaussian distribution with a sigma of 15°.

13. The luminaire of claim 11, wherein for each mentioned luminaire the mirror comprises a textured surface.

14. The luminaire of claim 1, wherein:
    a) the light-saving means comprises a second luminaire having the same features as recited in claim 1 for the first-mentioned luminaire;
    b) the second end of the first-mentioned luminaire being integrally joined to the second end of the second luminaire; and
    c) the longitudinal axis of the first-mentioned luminaire being angled with respect to the longitudinal axis of the second luminaire.

15. The luminaire of claim 1 or 2, wherein for each mentioned luminaire the surface of the light pipe is free of a transport cladding layer having an index of refraction substantially larger than that of air but substantially less than that of the core.

16. The luminaire of claim 1 or 2, wherein for each mentioned luminaire the light-extraction efficiency of the light-extraction means in creases non-monotonically from the first end to the second end of the light pipe.

17. The luminaire of claim 16, wherein for each mentioned luminaire:
   a) the light-extraction efficiency at the second end is less than the maximum light-extraction efficiency along the length of the luminaire; and
   b) the light-saving means directing saved light from the second end towards the first end at absolute value of alpha redirection angles exceeding 20°.

18. The luminaire of claim 16, wherein for each mentioned luminaire the light-extraction efficiency of at the second end is at a maximum light-extraction efficiency along the length of the luminaire.

19. The luminaire of claim 16, wherein for each mentioned luminaire any gaps in the light-extraction means along the longitudinal axis are less than about 20 percent of the diameter of the light pipe.

20. The luminaire of claim 1 or 2, wherein for each mentioned luminaire the illuminance over each of each sequential 5 percent length of the luminaire is uniform to within 10 percent of the average illuminance along the length of the luminaire.

21. The luminaire of claim 1 or 2, wherein for each mentioned luminaire the light-extraction means comprises:
   a) a layer of paint exhibiting Lambertian-scattering and having a binder with a refractive index about the same as, or greater than that of, the core; and
   b) light-scattering particles in the paint.

22. The luminaire of claim 21, wherein for each mentioned luminaire the paint comprises an organic solvent-based paint.

23. The luminaire of claim 1 or 2, wherein for each mentioned luminaire further comprising:
   a) an elongated reflector shaped to partially surround the luminaire and having a longitudinal opening facing the first longitudinal side of the luminaire; the reflector serving to reflect light scattered by the light-extraction means to a desired target area to be illuminated;
   b) the reflector having a non-specular, diffuse reflecting surface; and c) the width of the reflector at the opening to the reflector being at least 1.3 times the maximum cross-sectional dimension of the luminaire.

24. The luminaire of claim 1 or 2, wherein for each mentioned luminaire the light pipe has a light-carrying portion of acrylic polymer.

25. The luminaire of claim 1 or 2, wherein for each mentioned luminaire the light pipe has a light-carrying portion made of quartz.

26. The luminaire of claim 1 or 2, wherein for each mentioned luminaire the light-extraction means comprises a material adhesively attached to the luminaire.

27. The luminaire of claim 1 or 2, wherein for each mentioned luminaire the light-extraction means further comprises a textured surface of the light pipe core.

28. The luminaire of claim 27, wherein for each mentioned luminaire the textured surface comprises structures selected from the group consisting of generally hemispherical shapes: generally conical shapes, generally cylindrical shapes and generally prismatic shapes.

29. The luminaire of claim 1 or 2, wherein for each mentioned luminaire the light-extraction means comprises a roughened surface of the light pipe core.

30. The luminaire of claim 29, wherein for each mentioned luminaire the roughened surface is chemically etched.

* * * * *

UNITED STATES PATENT AND TRADEMARK OFFICE
CERTIFICATE OF CORRECTION

| | | |
|---|---|---|
| PATENT NO. | : 7,163,326 B2 | Page 1 of 1 |
| APPLICATION NO. | : 11/108279 | |
| DATED | : January 16, 2007 | |
| INVENTOR(S) | : Cassarly et al. | |

It is certified that error appears in the above-identified patent and that said Letters Patent is hereby corrected as shown below:

Column 1, after line 5 insert:

GOVERNMENT INTEREST

This invention was made with Government support under Agreement Number DAAH01-03-9-R001 awarded by the U.S. Army Aviation and Missile Command. The Government has certain rights in the invention.

Signed and Sealed this

Second Day of September, 2008

JON W. DUDAS
*Director of the United States Patent and Trademark Office*